United States Patent [19]

Rowe et al.

[11] 4,115,828
[45] Sep. 19, 1978

[54] ARC DETECTION AND CONTROL APPARATUS

[75] Inventors: Don H. Rowe, Portola Valley; Michael W. Sasnett, Los Altos, both of Calif.

[73] Assignee: GTE Sylvania Incorporated, Mountain View, Calif.

[21] Appl. No.: 784,699

[22] Filed: Apr. 5, 1977

[51] Int. Cl.² .......................... H02H 7/22; H02H 3/32
[52] U.S. Cl. ..................................... 361/1; 331/94.5 S; 331/94.5 T; 361/86; 361/88
[58] Field of Search ..................... 361/92, 88, 90, 86, 361/1, 2, 6, 175, 235; 219/69 S, 69 G, 121 L; 323/21; 330/4, 3; 331/94.5 R, 94.5 G, 94.5 T, 94.5 S, 94.5 PE; 328/259, 135; 315/127, 208, 339, 349, 363

[56] References Cited

U.S. PATENT DOCUMENTS

| 3,713,020 | 1/1973 | Kohler | 361/86 X |
| 3,746,930 | 7/1973 | Best et al. | 361/86 |
| 3,825,713 | 7/1974 | Bell, Jr. | 219/69 S X |
| 3,928,819 | 12/1975 | Bernstein | 331/94.5 PE |

FOREIGN PATENT DOCUMENTS 1,202,917  8/1970  United Kingdom ..................... 315/339

Primary Examiner—Patrick R. Salce
Attorney, Agent, or Firm—John F. Lawler

[57] ABSTRACT

Arc detection and control apparatus for a high power high voltage gas laser with a constant current power supply comprises a circuit responsive to changes in voltage across the laser electrodes for disconnecting the power supply when the voltage change exceeds a predetermined limit. The circuit monitors a small proportional value of the interelectrode voltage through an optical coupler and has a multiplier circuit for converting detected voltage changes and the differential thereof into pulses with a constant amplitude for fixed percentage changes of the electrode voltage and into pulses with increasing amplitudes for proportionally greater electrode voltage changes. This circuit normalizes and filters the resultant pulses and permits them to be compared to a reference voltage in a comparator circuit. When the pulse amplitude exceeds the value of the reference voltage a control apparatus is actuated which disconnects the power supply from the laser electrodes.

4 Claims, 1 Drawing Figure

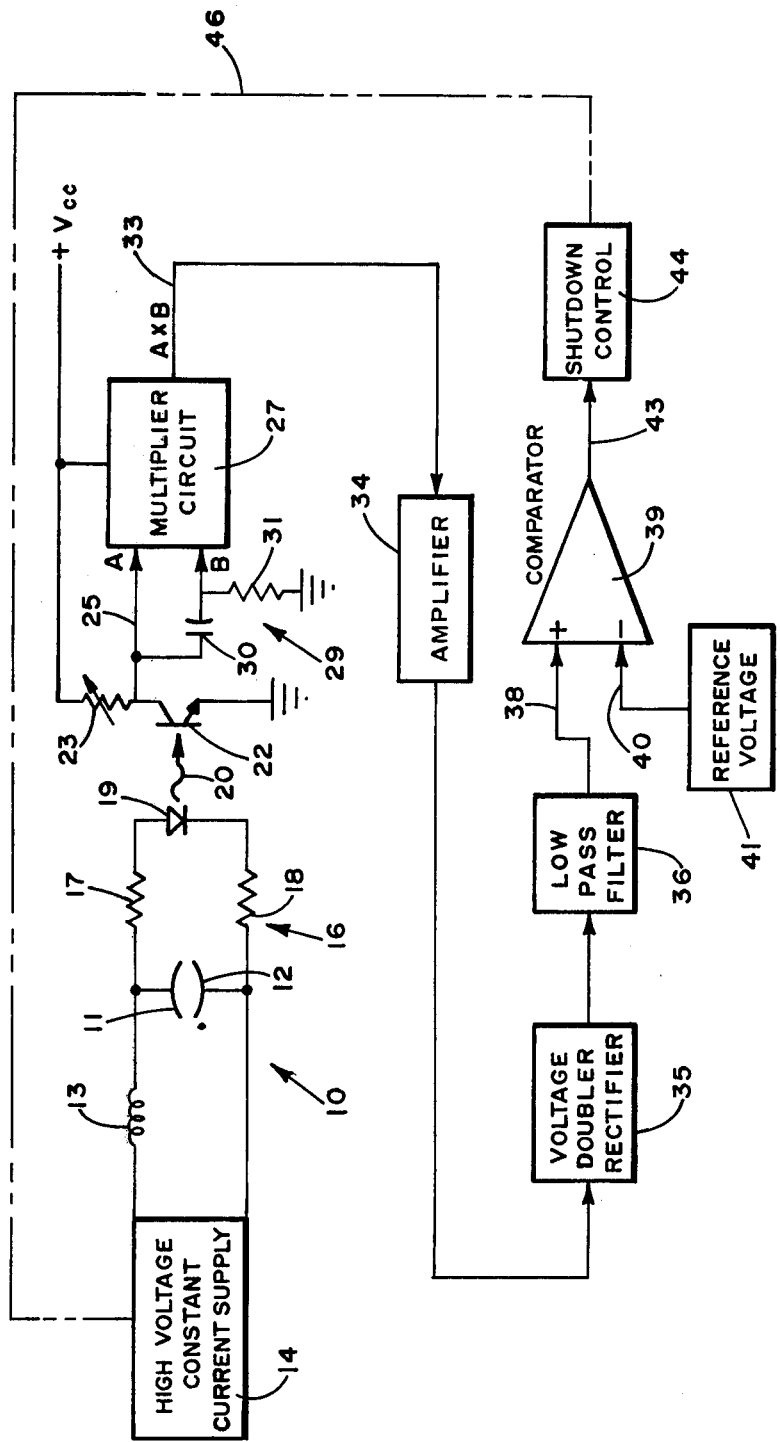

ARC DETECTION AND CONTROL APPARATUS

BACKGROUND OF THE INVENTION

This invention relates to lasers and more particularly to an improved arc detection and control circuit for a high power gas laser.

A $CO_2$ gas transport laser that has been built and successfully operated for producing continuous wave output power in the order of 1 to 2 KW is described in U.S. Pat. No. 3,772,610. Wide use of that laser and the discovery of new industrial applications have resulted in demands for even higher output powers, i.e., in the order of 5 KW and above. One way to achieve higher power levels in such a laser is to increase the current density in the glow discharge by increasing the current in the discharge. As the current is increased, however, slight variations in the gas flow and composition tend to produce instabilities which cause the laser to arc. The energy contained in such arcs in a high power laser is so high that severe damage to the electrodes, power supply, and other parts of the laser can occur within a relatively short time, i.e., in 50 to 500 milliseconds.

In accordance with prior practice of protecting against arcs in glow discharge devices, a meter relay is connected across the electrodes to detect increases in discharge current occasioned by arcs and to trip a relay when the current exceeds a predetermined level, see "Gaseous Conductors" by James Cobine, pages 205-209 (Dover, 1958). Such a technique is not feasible for the afore-mentioned high power gas transport laser because stable operation of the laser requires that the discharge current be tightly regulated, i.e., held constant. This means that the current does not change substantially when the arc occurs. Instead, the voltage across the electrodes drops. Further disadvantages of the meter relay approach are the slow response time which permits considerable arc damage to the internal laser components prior to automatic shutdown of the power supply and the generally unreliable operation due to the fact that the operator must remember to set the current trip needle just above the operating point, a step which has, in practice, often been forgotten.

This invention is directed to a solution to these problems.

OBJECTS AND SUMMARY OF THE INVENTION

A general object of the invention is the provision of arc detection and control apparatus for a high power constant current gas laser which effects disconnection of the power supply quickly after inception of an arc across the electrodes and prior to damage to laser components from arc current, i.e., in about 5 to 10 milliseconds.

A further object is the provision of such apparatus which is factory adjustable and requires no attention from the operator prior to normal start-up of the apparatus.

These and other objects of the invention are realized with apparatus which senses the change in voltage across the laser electrodes which results when the arc occurs and converts a predetermined reduced proportion of that voltage change into a pulse having an amplitude corresponding to the product of the magnitude and rate of change of that voltage. By comparing such pulse with a reference voltage, a control voltage is obtained when the threshold is exceeded for instantly disconnecting the power supply across the laser electrodes irrespective of the initial setting of the laser operating voltage and current.

BRIEF DESCRIPTION OF DRAWING

The single drawing is a schematic and block representation of the detection and control apparatus embodying this invention.

DESCRIPTION OF PREFERRED EMBODIMENT

Referring now to the drawing, a gas laser circuit is represented schematically at 10 and comprises electrodes 11 and 12 connected through an inductor 13 to a high voltage constant current power supply 14. The laser beam is generated in an electrical discharge between the electrodes 11 and 12 and through a moving volume of a gas, such as a carbon dioxide mixture as described in the aforementioned patent.

In order to sense the occurrence of an arc between electrodes 11 and 12 during normal operation of laser 10, a circuit 16 is connected across those electrodes to measure changes in voltage and comprises high value resistors 17 and 18 connected to electrodes 11 and 12, respectively, and a light emitting diode 19 connected across the resistors. By way of example, resistors 17 and 18 may have a value of 600 kilo ohms and diode 19 a max current rating of 10 ma. Changes in interelectrode voltage produce a proportional change in current through diode 19 which in turn emits light, indicated by the wavey arrow 20, having an intensity likewise proportional to the voltage change.

A photodetector 22 adjacent to diode 19 is biased by a low voltage source $V_{cc}$ through a variable resistor 23 and produces a voltage on line 25 connected between the photodetector 22 and resistor 23 that is proportional to the intensity of light from diode 19 incident on photodetector 22. The optical coupling between diode 19 and photodetector 22 effectively isolates the high and low voltage circuits. Line 25 is connected as one input A to a multiplier circuit 27 which is also connected to low voltage source $V_{cc}$. In order to detect rapid negative changes in the voltage drop across the electrodes 11 and 12 caused by an arc, a differentiator circuit 29 is connected between the photodetector output line 25 and ground. Differentiator 29 comprises capacitor 30 connected to line 25 and resistor 31 connected to ground with the common connection between the capacitor and resistor connected as a second input B to multiplier circuit 27.

Multiplier circuit 27 is a standard commercially available component, such as Model MC1495L multiplier manufactured by Motorola.

The output of multiplier circuit 27 on line 33 is amplified in amplifier 34 and is then passed through voltage doubler rectifier 35 and low pass filter 36 to produce on filter output line 38 a voltage pulse having an amplitude corresponding to the amplitude of the pulse output of multiplier 27. The polarity of the DC output on line 38 is positive. Line 38 is connected to the positive input terminal of a comparator 39 having a second or negative input terminal 40 connected to a variable reference voltage source 41. When the voltage input on line 38 exceeds the voltage input on line 40, a control voltage output from comparator 39 appears on line 43 connected to a shutdown control 44 for actuating the latter. Control 44 is operatively connected to power supply 14 as indicated by broken line 46 to disconnect power from the electrodes rapidly in response to a control voltage on line 43. Control 44 may, for example, comprise a reed relay across the power supply lockout. A principal reason for the fast response time of this circuit in disconnecting the power supply before arc damage occurs is that the changes in discharge conditions occasioned by the arcing are sensed at the electrodes by the voltage detection circuit.

In operation, the voltage across electrodes 11 and 12 when the laser is in operation is converted to current by circuit 16 so that the current flowing through diode 19 is proportional to the interelectrode voltage in the ratio of the value of resistors 17 and 18. This diode current is converted to light 20 which is reconverted to a voltage across line 25 proportional to the voltage across electrodes 11 and 12. Adjustment of the ratio of this proportioning is made via variable resistor 23 by the laser manufacturer and normally does not require further adjustment by the user.

The dynamic range of high power laser electrode voltage from start-up to the normal operating state is quite large, i.e., from 500 to 3,000 volts, and an arc can occur at any point over this range. In order to detect and respond to arcing over this voltage range by comparing the voltage change to a fixed threshold at comparator 39, the rate of change of interelectrode voltage as determined by differentiator 29 is multiplied by the proportionally reduced voltage at line 25 to produce a normalized pulse on line 33. Thus, regardless of the actual voltage across the electrodes, the amplitude of the pulse on line 33 for the same percentage change of electrode voltage is constant. The normalized pulse is then amplified and rectified to eliminate any negative components and is applied through a filter to comparator 39 for comparison with the threshold voltage. The control voltage output from the comparator on line 43 occurs when the threshold voltage is exceeded and causes control 44 to disconnect the power supply from the electrodes.

By way of example, arc detection and control apparatus of this invention has been built and successfully operated under the following conditions and with the following results:

| | |
|---|---|
| Interelectrode voltage | 3000 V |
| Diode current | 5 ma |
| $V_{cc}$ | 12 V |
| Line 25 voltage | 1 V |
| Differentiator 29 | |
| Capacitor 30 | 0.1 μf |
| Resistor 31 | 10K ohms |
| Pulse on line 33 (A×B) | 0.25 V for 20% change of interelectrode voltage |
| Line 40 threshold voltage | 3 V |
| Time for disconnection of power supply after inception of arc. | ≈ 10 ms |

What is claimed is:

1. Arc detection and control apparatus for a high power gas discharge laser having first and second electrodes and a constant current DC power supply connected across said electrodes comprising
   a light emitting diode coupled across said electrodes and adapted to emit light having an intensity proportional to the voltage across said electrodes,
   a photosensitive detector optically coupled to said diode and adapted to produce a current proportional to the intensity of light emitted by said diode,
   means for converting said detector current into a detector voltage, said voltage being substantially less than and proportional to said voltage across said electrodes,
   means for differentiating said detector voltage,
   means for multiplying said detector voltage and the output of said differentiating means,
   means for comparing the output of said multiplying means with a reference voltage whereby to produce an output when the former exceeds the latter, and
   control means responsive to the output of said comparing means and operatively connected to said power supply to disconnect the latter from said electrodes upon occurrence of an arc.

2. Arc detection and control apparatus for a high power gas discharge laser having first and second electrodes and a constant current high voltage DC power supply connected across said electrodes comprising
   means for measuring changes in the voltage across said electrodes,
   means for converting said voltage change to a reduced value less than 50 percent of the total voltage drop across said electrodes,
   means to differentiate said reduced value of voltage change,
   means to multiply the output of said differentiating means and said reduced value whereby constant percentage changes in interelectrode voltage produce a constant amplitude pulse,
   means for comparing said reduced value of voltage changes with a reference voltage for producing an output when said reference voltage is exceeded, and
   control means operatively connected to said power supply and responsive to the output of said comparing means for disconnecting the power supply from said electrodes.

3. Apparatus according to claim 2 in which said converting means comprises an optical coupler adopted to isolate the high voltage across said electrodes.

4. Apparatus according to claim 3 with means to differentiate said reduced voltage change, and
   means to multiply the output of said differentiating means and said reduced voltage whereby constant percentage changes in interelectrode voltage produce a constant amplitude pulse.

* * * * *